(12) United States Patent
Greenwood et al.

(10) Patent No.: US 7,578,333 B2
(45) Date of Patent: Aug. 25, 2009

(54) MACHINE AND METHODS FOR THE MANUFACTURE OF AIR-FILLED CUSHIONS

(75) Inventors: John Stuart Greenwood, Suffolk (GB); Neil Glynn Price, Paris (FR)

(73) Assignee: Pregis Corporation, Lake Forest, IL (US)

( * ) Notice: Subject to any disclaimer, the term of this patent is extended or adjusted under 35 U.S.C. 154(b) by 350 days.

(21) Appl. No.: 11/185,927

(22) Filed: Jul. 19, 2005

(65) Prior Publication Data
US 2006/0292320 A1  Dec. 28, 2006

Related U.S. Application Data

(60) Provisional application No. 60/589,748, filed on Jul. 20, 2004.

(51) Int. Cl.
*B32B 37/00* (2006.01)
(52) U.S. Cl. ........................ 156/498; 156/145; 156/147
(58) Field of Classification Search ................. 156/147, 156/145, 498
See application file for complete search history.

(56) References Cited

U.S. PATENT DOCUMENTS

| | | | |
|---|---|---|---|
| 3,366,523 A | 1/1968 | Weber | |
| 3,667,593 A | 6/1972 | Pendleton | |
| 3,817,803 A | 6/1974 | Horsky | |
| 3,868,285 A | 2/1975 | Troy | |
| 4,017,351 A | 4/1977 | Larson et al. | |
| 4,049,854 A | 9/1977 | Casey et al. | |
| 5,824,392 A | 10/1998 | Gotoh et al. | |
| 6,209,286 B1 | 4/2001 | Perkins et al. | |
| 6,410,119 B1 | 6/2002 | De Luca et al. | |
| 6,582,800 B2 | 6/2003 | Fuss et al. | |
| 6,659,150 B1 | 12/2003 | Perkins et al. | |
| 6,889,739 B2 * | 5/2005 | Lerner et al. | 156/498 |
| 2003/0163976 A1 | 9/2003 | Perkins et al. | |
| 2004/0154728 A1 * | 8/2004 | Selle et al. | 156/147 |

FOREIGN PATENT DOCUMENTS

WO    WO 01/21391    3/2001

* cited by examiner

*Primary Examiner*—Jeff H Aftergut
(74) *Attorney, Agent, or Firm*—Dorsey & Whitney LLP

(57) ABSTRACT

A device and method are disclosed for forming air filled cushions. The device includes a drive mechanism to move inflatable tubing through the apparatus, and an injector, optionally including an outlet, located continuously within, or within a portion of, the tubing. This arrangement can permit the formation of air filled cushions in a continuous stream. Also disclosed is a roll of plastic tubing that is sealed transversely at a succession of intervals, with each pair of seals stopping just short of a longitudinal center line of the tubing. Such tubing might be used in conjunction with the apparatus, the central gap between the seals allowing passage of the injector.

19 Claims, 5 Drawing Sheets

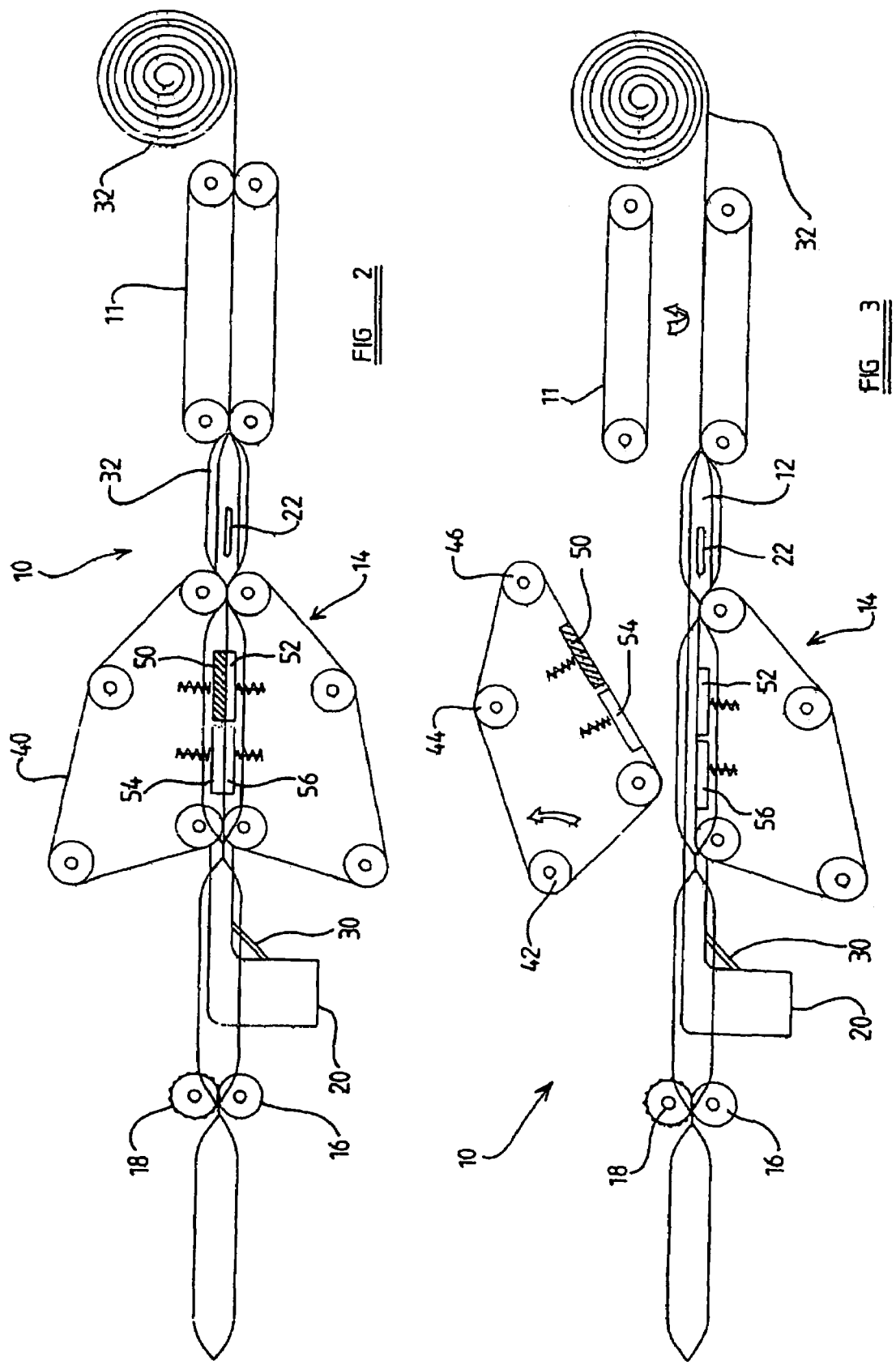

MACHINE AND METHODS FOR THE MANUFACTURE OF AIR-FILLED CUSHIONS

CROSS-REFERENCE TO RELATED APPLICATIONS

This application claims the benefit of provisional application 60/589,748 filed Jul. 20, 2004, the entire content of which is expressly incorporated herein by reference thereto.

BACKGROUND OF THE INVENTION

1. Field of the Invention

This invention relates to improvements in the manufacture of air filled cushions. In particular, although not exclusively, this invention relates to air cushions of thin-walled plastic sheet, which can be used as infill or cushioning in the packaging and transportation of fragile articles.

2. Description of Related Art

Conventionally, air filled cushions are manufactured from a roll of plastic tubing. A typical example of a method of manufacturing these cushions is described in International Patent Application WO 01/21391, incorporated by reference herein in its entirety. In this method the plastic tubing is drawn through the machine from a supply roll. The walls of the plastic tubing are separated by drawing the tubing over a separator member. Air is then injected into the space between the wall through a needle, which pierces one of the walls of the tube, the hole left by the needle later being isolated by a heat seal. This process requires careful coordination of the position of the separator member and the air injecting needle, and good control of the air injecting needle so that only one wall of the tubing is pierced.

A different way of manufacturing air filled cushions is to pre-perforate the plastic tubing and blow air into the tube through the perforations. Again, this requires careful coordination of the position of the injection head and the plastic tubing.

Both of these processes are stop-start processes, in that the movement of the plastic tubing through the machine must be halted whilst the cushion is filled. Other references disclosing such processes include U.S. Pat. Nos. 4,049,854, 3,868,285, 3,667,593, and 3,366,523, each of which is incorporated by reference herein in its entirety. The throughput rate of the machines is therefore limited. Furthermore, since both processes inject air into the cushions through relatively small holes, a high pressure air injection system, including an air compressor, can be required.

Various attempts have been made to develop a continuous process for filling air cushions, but have been only partially successful, problems being encountered in a number of areas. The difficulty of injecting air into a moving cushion leads to problems with under and over inflation of the cushions. One solution to this has been to inject air into the cushion using high pressure bursts of air, but this requires a high pressure air injection system and a complex control system. Such systems are described in, for example, U.S. Pat. Nos. 4,017,351, 3,817,803, 6,582,800, 6,659,150, 6,209,286, 5,824,392, 6,410,119 and U.S. Patent Publication No. US 2003-0163976, each of which is incorporated by reference herein in its entirety.

An additional problem relates to the heat sealing mechanism. When the machine must be stopped the heat sealer cools down, and when it is restarted the heat sealer takes a small amount of time to reach operating temperature, so that one or more air cushions can not be formed properly.

Moreover, further difficulties are encountered in conventional machines, including difficulty of machine set-up, particularly in drawing the tubing into and through the machine.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a machine for the production of air filled cushions including a drive mechanism which is operative continuously to move plastic tubing through the machine along a predefined path, and an injector located in the predefined path disposed within the plastic tubing as the tubing is moved through the machine.

In further accordance with the invention, the injector has an inlet and an outlet and the drive mechanism is operative to move the plastic tubing over the outlet of the injector, whereby air can be injected through the injector into the plastic tubing. In this way, relatively low pressure air can be used, allowing for the use of a simpler air delivery and/or control system. Preferably the pressure is less than 5 psi, and most conveniently a pressure of 1-2 psi is used. The injector can be provided with a single outlet, but preferably has two or more outlets, arranged around its periphery, each outlet being operative to inflate a portion of the plastic tubing. Preferably the injector is provided with a cutter, upstream of the inlet, to cut a surface of the plastic tubing, allowing the plastic tubing to pass around the inlet.

In further accordance with the invention, the machine can be adapted for use with plastic tubing having two rows of transverse, parallel, welds, the welds of each row extending toward a longitudinal centerline of the tubing from a respective one of the side edges. Furthermore, a weld of one row can be generally co-linear with a weld of the other row, with an unwelded section between them. In use, the injector can be located generally within the unwelded section, whereby at least one outlet of the separator member can be operative to inflate portions of the plastic tubing defined by adjacent welds in each row.

In further accordance with the invention, the machine can include a sealing mechanism. The sealing mechanism can be located downstream of the outlet so as to seal the plastic tubing longitudinally. Preferably the sealing mechanism is a heat sealer mechanism, which has an operating position in which it abuts the plastic tubing and a standby position in which it is removed from the plastic tubing and the heat sealer can be moved from the operating position to the standby position when the machine is stopped. In a preferred embodiment the heat sealer comprises at least two spaced elongate bars, which are preferably generally equal in length to the air filled cushions produced by the machine. This ensures a good seal can be achieved.

In further accordance with the invention, the machine can further include a perforator. The perforator can be located downstream of the sealing mechanism, whereby the perforator is operative to perforate the plastic tubing longitudinally. Preferably the machine further comprises a barrier, upstream of the injector, which is operative to maintain portions of the tubing deflated. The machine can also include a pressure sensor which is operative to place an outlet in fluid communication with the inlet if the pressure in the injector becomes too high. The machine can be provided with further sensors and control mechanisms, such as a speed sensor and control and an inflation sensor and control.

In accordance with another aspect of the invention, there is further provided a roll of tubing that is sealed transversely at a succession of spaced intervals along its length by pairs of seals, each seal extending in a line from a respective opposite edge of the plastic tubing to a short distance from the centre thereof. Preferably the seals have little or no significant longitudinal components. The tubing can be made of a plastic material, but can also be made at least in part from other materials such as paper that is sealed using an adhesive or other means.

In further accordance with the invention, a method is provided of producing air filled cushions. The method includes providing a roll of tubing being sealed transversely at a succession of spaced intervals along its length, by pairs of seals, each seal extending in a line from a respective edge of the plastic tubing to a short distance from the centre thereof, continuously inflating the tubing between successive seals to form inflated cushions, and sealing the tube along at least one longitudinal line. Preferably, the tube is sealed along at least two longitudinal lines where each longitudinal seal extends across two transverse seals.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawing serves to explain the principles of the invention.

BRIEF DESCRIPTION OF THE DRAWINGS

Preferred embodiments of the invention, selected by way of example, will now be described, with reference to the following drawings, in which:

FIG. 2 shows schematically a section view of the internal components of the machine during the manufacturing process;

FIG. 3 shows schematically a section view of the internal components of the machine when opened to load or unload plastic tubing;

DETAILED DESCRIPTION OF THE PREFERRED EMBODIMENT

Figure 1:
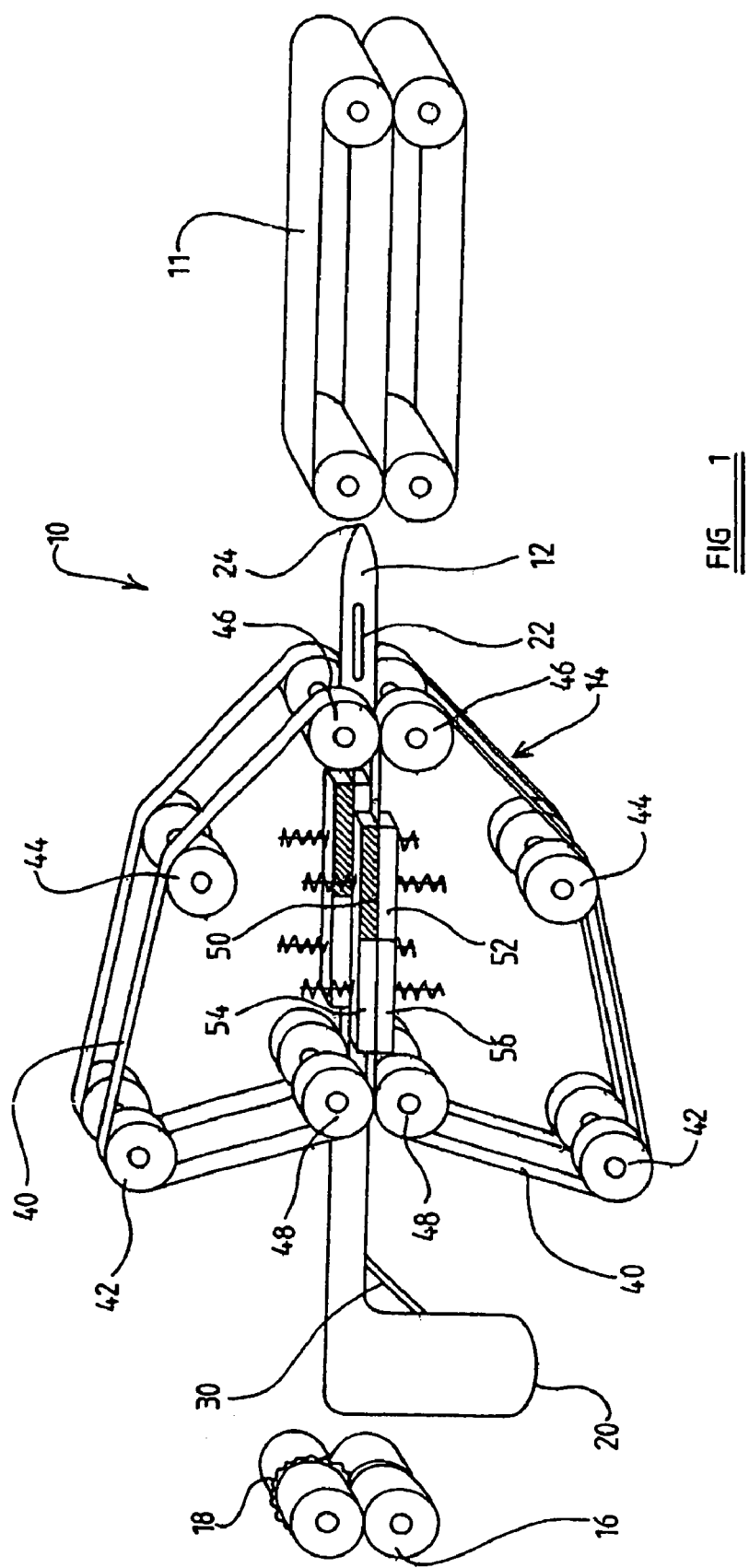
FIG. 1 shows schematically a perspective view of internal components of a machine suitable for the manufacture of air-filed cushions.

Reference will now be made in detail to the present preferred embodiments of the invention, examples of which are illustrated in the accompanying drawings. The method and corresponding steps of the invention will be described in conjunction with the detailed description of the system.

The methods and systems presented herein may be used for providing packaging cushions for cushioning articles during shipment. For purpose of explanation and illustration, and not limitation, an exemplary embodiment of the system in accordance with the invention is shown in FIG. 1 and is designated generally by reference character 10.

The internal components of a machine for the manufacture of gas-filled (preferably air-filled) cushions is illustrated in FIG. 1. The machine 10 comprises an air barrier 11, an injector 12, heat sealers 14, and pull rollers or drive rollers 16, which incorporate a perforator 18. These components of the machine 10 define a path along which tubular film passes through the machine 10.

A variety of materials can be used for the film material. Most preferably, a plastic material of varying weights of polyethylene can be used. However, other types of plastic films can be used as desired, including metallized plastic films and the like. Moreover, other materials such as paper based films can also be used that are sealed with adhesive material, or paper films having a thin polyethylene coating to facilitate sealing can also be used.

As depicted herein, the air barrier 11 is disposed upstream of the injector 12 and includes two tracked belts. These belts are preferably made from spongy, rubberized tracking material. The injector 12 comprises an elongate hollow tube having an air inlet 20 and a plurality of outlets 22. At its upstream end it has a smooth rounded tip 24. The outlets 22 are disposed close to the tip 24 and comprise a pair of elongate slits which are disposed diametrically opposite from each other on the circumference of the injector 12.

In further accordance with the invention, as depicted herein, heat sealers 14 are disposed downstream of the injector, adjacent to the outlets. Since heat sealers 14 are identical, only one heat sealer will be described. As depicted herein, for purposes of illustration and not limitation, heat sealer 14 includes two belts 40, each belt 40 arranged around four wheels: a drive wheel 42, a tensioner wheel 44 and two idler wheels 46, 48. The two belts 40 run parallel and adjacent to each other between the idler wheels 46, 48 and between them define a path through which the plastic tubing is drawn. Four heat sealing blocks 50, 52, 54, 56 are disposed along this portion of the belts arranged in pairs of blocks of which one is positioned above and one is positioned below the belts. The upper upstream one of these blocks 50 is heated sufficiently to weld the plastic tubing together and all four blocks 50, 52, 54, 56 are spring loaded to press together and close the belts onto the plastic tubing, providing sufficient pressure to complete the seal.

Figure 4:
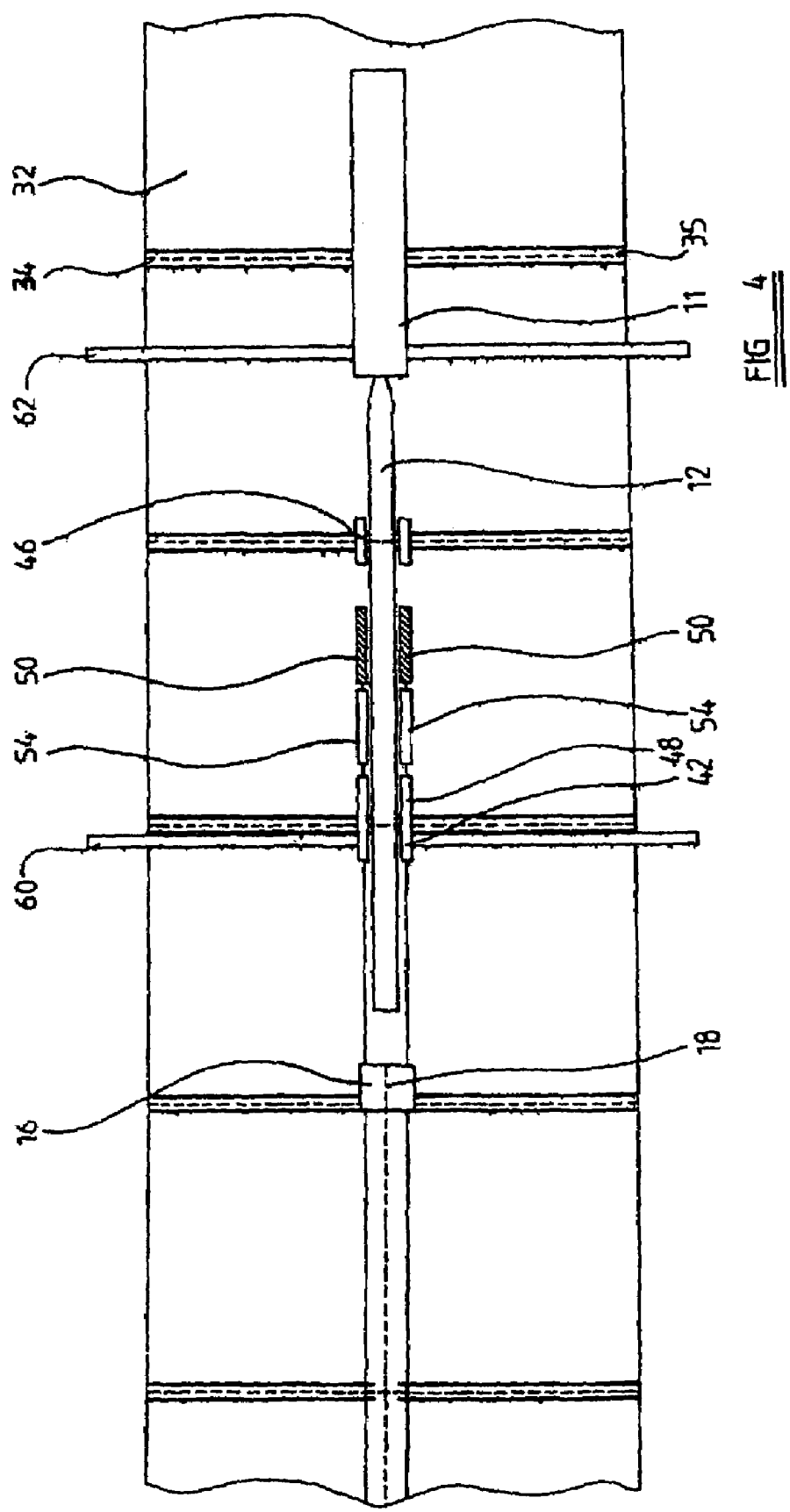
FIG. 4 shows schematically a top view of the internal components of the machine during the manufacturing process.

For purposes of illustration and not limitation, as embodied herein, the inlet 20 is a hollow tube, which is disposed downstream of the sealing rollers. Inlet 20 projects downwardly from the injector 12. A cutter, preferably a knife 30, is disposed at the upstream end of the inlet 20, and projects diagonally between the inlet 20 and the injector 12. It should be noted that a hot wire could be used instead of or in addition to a cutter. The inlet 20 also supports the machine 10, being attached to a superstructure (not shown) which hold s the injector 12 in a fixed position in use. Various of the rollers and drive band wheels are also supported, being attached to the side of the machine by axles 60, 62, as shown in FIG. 4. The pull rollers 16 are arranged just downstream of the inlet 20 and the injector 12. The perforator 18 is arranged along the centerline of the machine 10, to perforate between the seals produced by the heat sealers 14.

For purposes of illustration and not limitation, as embodied herein, FIG. 2 illustrates the machine 10 in use, with polythene tubing being drawn through it. FIG. 4 provides a top view of the air cushion production process. A tube 32 of polythene film, typically 400mm wide, is provided.

The tube 32 of film can be provided on a roll mounted on an unwind shaft as depicted, or can be supplied in fan-folded form in a box, as desired. Moreover, a support cradle can alternatively be used as depicted in WO 01/21391. Such a cradle can be advantageous in that a roll of film 32 can be placed thereon with a minimum of effort. Using a cantilevered unwind shaft can be disadvantageous to the extent that the roll of film 32 has to be further manipulated to fit it over the shaft. Merely requiring the roll to be placed on top of two rollers in a cradle arrangement minimizes the need to maneuver the roll, thereby minimizing the time required for an operator to hold the roll of film 32. This results in a time savings, and, more importantly, reduces the chances for operator injury (particularly back strains) as rolls of film 32 can be quite heavy if they are large.

Figure 5:
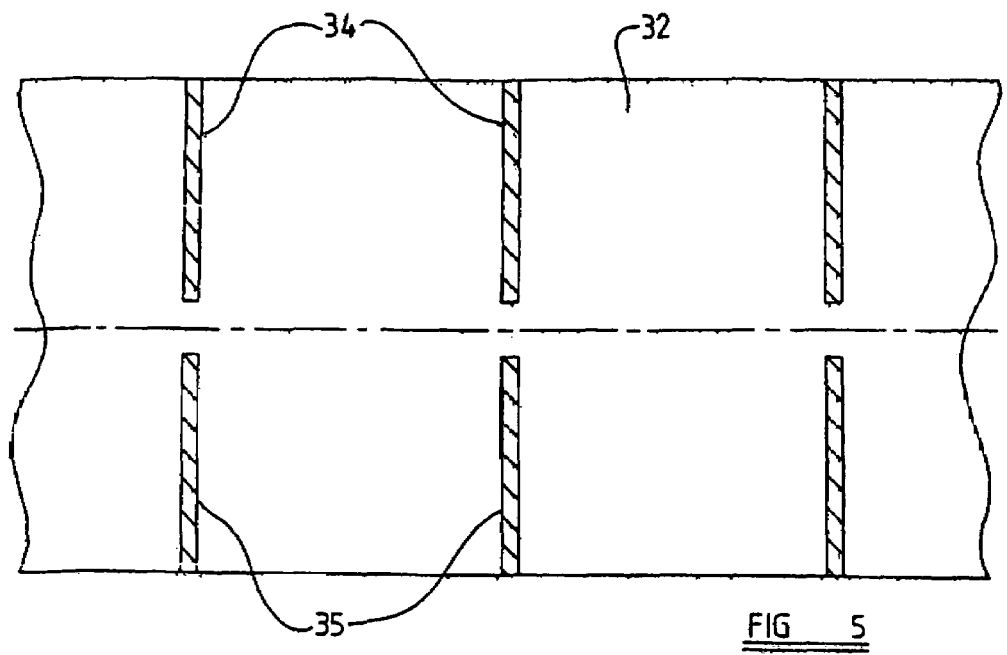
FIG. 5 shows schematically a portion of plastic tubing suitable for use in the machine.

The tubing, shown in FIG. 5, has two rows of transverse, parallel welds or seals, 34, 35. The tube 32 can also be pre-perforated across its width, along the line of the transverse seals 34, 35. The rows of seals 34, 35 extend toward a longitudinal centerline of the tubing 32 from a respective one of the side edges, a weld of one row 34 being generally co-linear with a weld of the other row 35, and the rows of welds having an unwelded portion between them.

As an alternative to perforations, score lines can additionally or alternatively be used to separate cushions from one another. Score lines can present the additional advantage that air leakage is minimized during inflation. Moreover, not having perforations across the inflation channel of the roll of film 32 can prevent the film from getting caught on the inflation tube, as it is known that perforations can cause such problems, thereby requiring the machine to be shut off, thereby reducing efficiency. Score lines can be formed on the roll of film 32 by mechanical deformation. More preferably, the score lines can be formed by way of laser scoring. Laser scoring is advantageous in that it permits precise control of the depth of the score line, permitting unprecedented flexibility and control on the amount of force needed to separate air filled cushions from one another.

To load the polythene tubing 32 onto the machine, the air barrier 11 is lifted apart, as shown in FIG. 3, and the injector 12 is inserted into the tubing at the unwelded portion between the rows of the transverse seals 34, 35. The upper halves of the heat sealers 14 can be pivoted into a standby position, as shown in FIG. 3 so that the plastic tubing 32 can be drawn over the injector 12 and positioned between the pull rollers 16. The polythene tubing 32 is drawn through the machine 10 by the tracks which make up the air barrier 11, by the belts 40 of the heat sealers 14 and by the pull rollers 16. The pull rollers 16 operate marginally more quickly than the rest of the machine which places the tubing 32 under tension, even to the extent where some slippage through the rest of the machine can occur. In normal operation the tubing 32 is continually drawn from the roll of film 32 through the air barrier 11 by its tracks. The two layers of the tubing 32 are separated in its central, unwelded portion on reaching the smooth, rounded tip 24 of the injector 12. Air, at atmospheric pressure, enters the injector member 12 at the inlet 20 and is continually blown through the injector member to the outlets 22.

The presence of the air barrier 11 prevents excess upstream inflation. As the tubing 32 is drawn past the outlets 22 the portions of the tubing defined by adjacent welds 34, 35 in each row become inflated, as shown in FIG. 2. Since the injector 12 is disposed centrally in the tubing, with outlets 22 directed to either side, two portions, one at either side of the injector 12 are inflated as the tubing 32 is drawn over the outlets 22. To encapsulate the air in each portion the open side of each portion is sealed by heat sealers 14. These produce two longitudinal welds 36 which each join a pair of transverse welds 34, 35, sealing off the inflated air cushions. The downstream sealing blocks 54, 56 compress the tubing over the longitudinal weld 36, making it more secure.

Once sealed the tubing 32 must pass the inlet 20 of the injector member. To allow the tubing to pass around this inlet 20 the lower face of the tubing 32 is slit as it passes the knife 30 disposed just upstream of the inlet. The pull rollers 16 draw the tubing toward the perforator 18. The perforator 18 produces a row of perforations 38 in the centre of the bottom face of the tubing, between the longitudinal welds. These perforations allow the tubing to be separated longitudinally if desired. Alternatively, roll of film 32 can be provided with perforations pre-formed therein.

Figure 6:
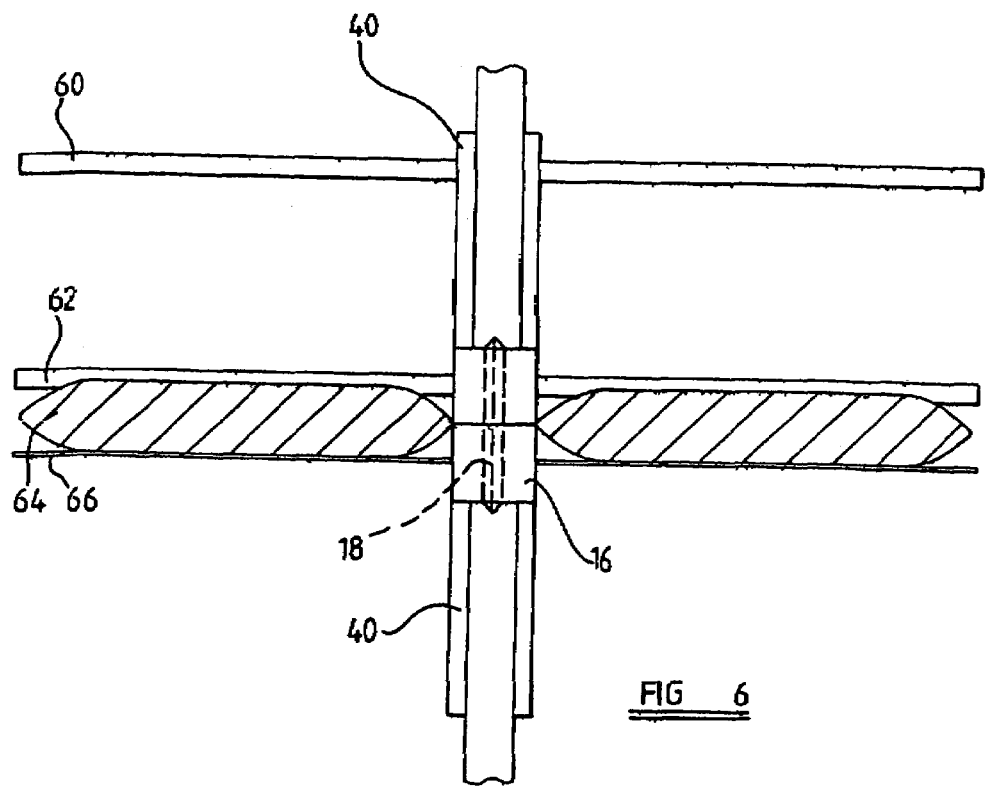
FIG. 6 shows schematically a rear view of the machine.

Finished cushions 64, supported by a cushion bed plate 66 are shown in FIG. 6, just before they leave the machine. This machine 10 has a much higher output rate than previous machines, both because it is able to run continually, and because it can produce two streams of air cushions at once. Since the air can be injected through relatively large outlets 22 there is no need for compressed air to be used. The machine, 10 is, therefore, simple to use, having just an on-off and a temperature control. Further controls, such as a speed control and an inflation control could be added to the system if desired.

The machine 10 is able to produce air cushions which are joined together to form a matrix of cells. Since these cells are more difficult to force apart they are more effective at protecting packages with irregular shapes. Furthermore, since the machine 10 can inflate multiple cushions through one central tube it uses the plastic tubing more efficiently than previous machines and generates less waste.

Although the machine 10 is designed to run continually it is sometimes necessary to stop it during a production run to maintain or repair the equipment. This can cause problems with the heat sealers 14, since conventionally the heated block 52 has to be cooled, to prevent the tubing being melted, and thus, when production is restarted, there is a warm-up time before it becomes operationally effective, during which cushions are unsealed and lost. This machine provides a facility for such eventualities. A top half of the heat sealer 14 is defined by the upper belt 40, its four wheels 42, 44, 46 and includes the upper heated sealing block 50 and the other upper sealing block 54. This half of the heat sealer is pivotally mounted along the axis of drive wheel 42 so that it can be swung away from its operative position, in which the portion of the belt between the idler wheels abuts the plastic tubing, to a standby position in which the belt lies away from the plastic tubing. This means that, should the machine need to stop during a production run the upper upstream sealing block can remain hot, ideally being maintained at a somewhat lower, standby, temperature by a thermostat. When the machine 10 is restarted the top section of the heat sealer 14 is pivoted back into its operating position and, since the heated sealing block 52 is still hot the sealing process can be immediately continued without losing any cushions.

Figure 7:
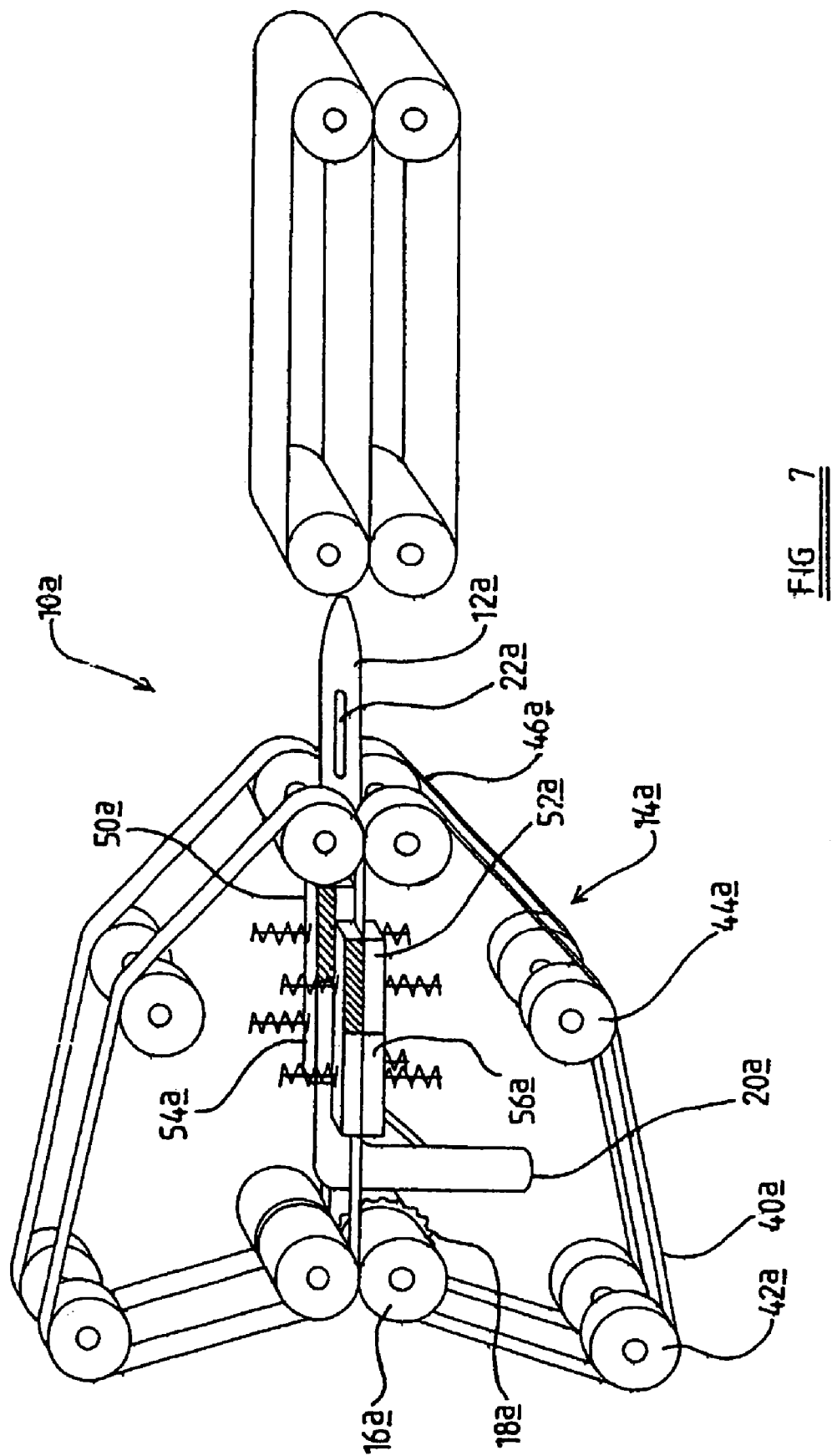
FIG. 7 shows schematically a second embodiment of the invention, having a more compact structure.

A second embodiment will now be described only in as much as it differs from the first embodiment, the same reference numerals being used for the same parts. If desired the machine 10a can be made more compact, as shown in FIG. 7. The injector 12a has been shortened in this embodiment so that the inlet 20a projects downwards just downstream of the heat sealing blocks 50a, 52a, 54a, 56a. Furthermore the pull rollers 16a form the driving element for the heat sealer belts 40a, the other wheels 42a, 44a, 46a, being idler wheels. The perforator 18a is thus arranged just downstream of the inlet 20a. Since the upper heat sealer 14a is still capable of pivoting to a standby position the perforator 18a is arranged on the lower pull roller 16a. Since the injector 12a is significantly shorter in this arrangement even less pressure is required to cause air to flow to the outlets 22a, making the machine 10a even more efficient to run.

The features disclosed in the foregoing description, or the following claims, or the accompanying drawings, expressed in their specific forms or in terms of a means for performing the disclosed function, or a method or process for attaining the disclosed result, as appropriate, can, separately, or in any combination of such features, be utilized for realizing the invention in diverse forms thereof. Such combinations extend to novel combinations of devices and methods expressly disclosed herein, alone or in combination with devices and references incorporated herein by reference.

What is claimed is:

1. A machine for the production of air filled cushions comprising:
    a) a drive mechanism which is operative to move layers of plastic through the machine along a predefined path;
    b) an injector located in the path and which, in use, is located within the plastic tubing as the tubing is moved through the machine, wherein the injector has an inlet and an outlet and the drive mechanism is operative to move the plastic tubing over the outlet of the injector, whereby air can be injected through the injector into the plastic tubing; and
    c) a sealing mechanism comprising first and second sealing portions having an operating position in which the sealing portions are disposed on opposite sides of the layers in the path and in association therewith for sealing the layers together to seal off the injected air, the first and second sealing portions being connected with respect to each other for moving between the operating position and a standby position, in which the sealing portions are separated from each other; and
    wherein the drive mechanism is associated with the sealing mechanism to move together between the operating and standby positions.

2. The machine according to claim 1, wherein the layers of plastic are associated as plastic tubing, and the injector has two or more outlets, arranged around its periphery, each outlet being operative to inflate a portion of the plastic tubing.

3. The machine according to claim 2, wherein the machine is adapted for use with plastic tubing having two rows of transverse, parallel welds, the welds of each row extending toward a longitudinal centerline of the tubing from a respective one of the side edges, a weld of one row being generally co-linear with a weld of the other row, with an unwelded section between them, and, in use, the injector member is located generally within the unwelded section, whereby at least one outlet of the separator member is operative to inflate portions of the plastic tubing defined by adjacent welds in each row.

4. The machine of claim 1 wherein the sealing mechanism is located downstream of the outlet to weld the plastic layers together longitudinally.

5. The machine of claim 4 wherein the sealing mechanism is a heat sealer, which has an operating position in which it abuts the plastic tubing and a standby position in which it is removed from the plastic tubing and the heat sealer can be moved from the operating position to the standby position when the machine is stopped.

6. The machine of claim 4, wherein the machine further comprises a barrier member located upstream of the injector that is configured to prevent air from passing through the film to prevent portions of the tubing from becoming inflated.

7. The machine of claim 1, wherein the heat sealer comprises at least two spaced elongate bars, which are generally equal in length to the air filled cushions produced by the machine.

8. The machine of claim 1, further comprising a perforator located downstream of the sealing mechanism, the perforator configured to perforate the plastic layers longitudinally.

9. The machine of claim 8 in which the heat sealer includes a driven belt, and the perforator is arranged on one of the rollers which support the belt.

10. The machine of claim 1, wherein the injector is provided with a cutter, upstream of the inlet, to cut a surface of the plastic layers, allowing the plastic tubing to pass around the inlet.

11. The machine of claim 1 further comprising a pressure sensor which is configured to open an outlet in the inlet if the pressure in the injector becomes too high.

12. In combination, a machine according to claim 1 and a roll of plastic tubing to be inflated that includes the layers sealed transversely at a succession of spaced intervals along its length by pairs of seals, each of the seals extending in a line transversely from a respective opposite edge of the plastic tubing and having no significant longitudinal component.

13. The machine of claim 1, wherein in the standby position the first sealing portion is disposed away from the layers.

14. The machine of claim 1, wherein the drive mechanism comprises a belt that extends around the first sealing portion.

15. The machine of claim 14, wherein the drive mechanism comprises another belt that extends around the second sealing portion.

16. The machine of claim 14, wherein the drive mechanism comprises a drive wheel in driving association with the belt and another wheel in supportive association with the belt, and said another wheel, belt, and first sealing portion are associated to pivot about the drive wheel between the operating and standby positions.

17. The machine of claim 16, wherein the drive wheel is spaced from the path.

18. The machine of claim 1, wherein the first sealing portion is associated with the second sealing portion for pivoting between the operating and standby positions.

19. The machine of claim 1, wherein the sealing mechanism is a heat sealer, and the machine is configured for maintaining the first portion heated when in the standby position.

* * * * *